(12) United States Patent
Wu et al.

(10) Patent No.: US 10,191,316 B2
(45) Date of Patent: Jan. 29, 2019

(54) COUPLING MECHANISM, BACKLIGHT MODULE AND LIQUID CRYSTAL DISPLAY DEVICE

(71) Applicants: RADIANT OPTO-ELECTRONICS (SUZHOU) CO. LTD., Wujiang, Jiangsu (CN); RADIANT OPTO-ELECTRONICS CORPORATION, Kaohsiung (TW)

(72) Inventors: Sung-Fu Wu, Kaohsiung (TW); Yi-Jen Chiu, Kaohsiung (TW)

(73) Assignees: RADIANT OPTO-ELECTRONICS (SUZHOU) CO. LTD., Wujiang (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 57 days.

(21) Appl. No.: 15/446,440

(22) Filed: Mar. 1, 2017

(65) Prior Publication Data
US 2017/0168345 A1    Jun. 15, 2017

Related U.S. Application Data

(63) Continuation of application No. PCT/CN2015/099433, filed on Dec. 29, 2015.

(30) Foreign Application Priority Data

Sep. 6, 2015   (CN) .......................... 2015 1 0559436

(51) Int. Cl.
   *G02F 1/1333*      (2006.01)
(52) U.S. Cl.
   CPC .................. *G02F 1/133308* (2013.01); *G02F 2001/13332* (2013.01); *G02F 2001/133314* (2013.01);
(Continued)

(58) Field of Classification Search
CPC ... G02F 1/133308; G02F 2001/133314; G02F 1/133314; G02F 1/13332
See application file for complete search history.

(56) References Cited

U.S. PATENT DOCUMENTS 9,482,892 B2 *  11/2016  Lai .................... G02F 1/133308
2012/0236541 A1    9/2012  Chen

FOREIGN PATENT DOCUMENTS

CN       101576668 A     11/2009
CN       102889528 A      1/2013
(Continued)

OTHER PUBLICATIONS

PCT/CN2015/099433 International Search Report of the International Searching Authority dated Jun. 8, 2016 (4 pages).
TW104130798 Taiwan Search Report dated Aug. 18, 2016 (2 pages).

*Primary Examiner* — Dung T Nguyen
(74) *Attorney, Agent, or Firm* — Perkins Coie LLP (57) ABSTRACT

A coupling mechanism includes a back plate and a frame unit. The back plate is formed with at least one engaging hole. The frame unit has at least one frame body, and at least one engaging member extending from the at least one frame body, and engaging the at least one engaging hole for coupling fixedly the at least one frame body to the back plate. The at least one frame body is deformable for disengaging the at least one engaging member from the at least one engaging hole, thereby permitting removal of the at least one frame body from the back plate.

17 Claims, 7 Drawing Sheets

(52) U.S. Cl.
CPC ............ *G02F 2001/133325* (2013.01); *G02F 2201/465* (2013.01)

(56) References Cited

FOREIGN PATENT DOCUMENTS

| | | |
|---|---|---|
| CN | 203365850 U | 12/2013 |
| CN | 204009298 U | 12/2014 |
| CN | 104570484 A | 4/2015 |
| CN | 204477811 U | 7/2015 |
| JP | 2007234376 A | 9/2007 |
| JP | 2009068117 A | 4/2009 |
| JP | 2005332111 A | 12/2015 |
| KR | 20060010541 A | 2/2006 |
| TW | 201027172 A | 7/2010 |
| TW | 201441728 A | 11/2014 |

\* cited by examiner

COUPLING MECHANISM, BACKLIGHT MODULE AND LIQUID CRYSTAL DISPLAY DEVICE

CROSS-REFERENCE TO RELATED APPLICATION

This application is a bypass continuation of International Application No. PCT/CN2015/099433 filed on Dec. 29, 2015, which claims priority of Chinese Patent Application Serial No. 201510559436.9, filed on Sep. 6, 2015, the entire content of each of which is incorporated herein by reference.

FIELD

The disclosure relates to a coupling mechanism, more particularly to a coupling mechanism that can be used without screws, and a liquid crystal display device that has the coupling mechanism.

BACKGROUND

Figure 1:
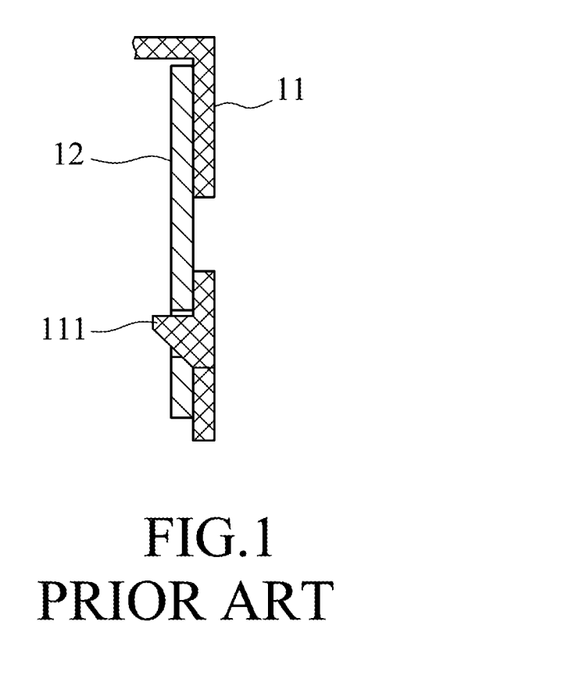
FIG. 1 is a fragmentary sectional view illustrating a coupling mechanism of a conventional liquid crystal display television.
Figure 2:
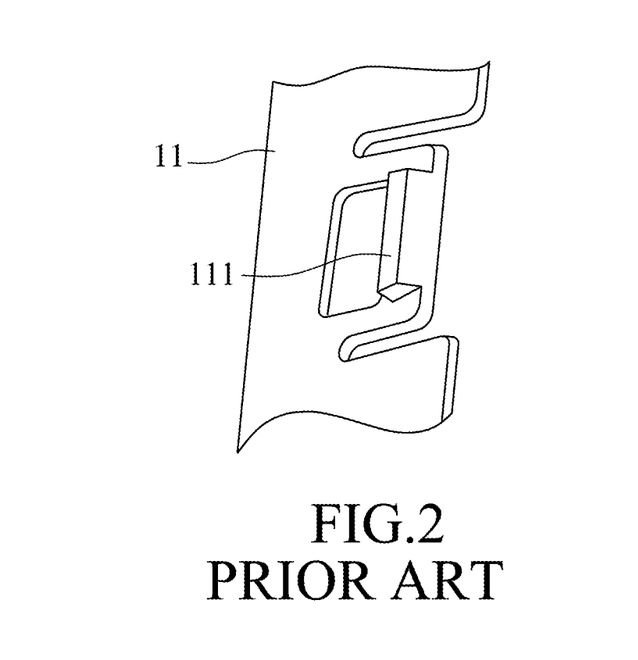
FIG. 2 is a fragmentary perspective view of a middle frame of the coupling mechanism of the conventional liquid crystal display television.

Currently, due to the development of backlight techniques and market requirements, liquid crystal display televisions are designed to be light, thin and narrow-framed. Referring to FIGS. 1 and 2, a middle frame 11 of a conventional liquid crystal display television is coupled to a back plate 12 with an engagement between a protruding hook 111 of the middle frame 11 and an engagement hole formed in the back plate 12.

However, when the middle frame 11 is coupled to the back plate 12, the middle frame 11 abuts against the back plate 12 without a gap being left therebetween. As a result, the protruding hook 111 cannot be easily disengaged from the engaging hole of the back plate 12.

SUMMARY

Therefore, an object of the disclosure is to provide a coupling mechanism that can alleviate at least one of the drawbacks of the prior art.

Accordingly, the coupling mechanism includes a back plate formed with at least one engaging hole, and a frame unit having at least one frame body and at least one engaging member. The at least one engaging member extends from the at least one frame body, and engages the at least one engaging hole for coupling fixedly the at least one frame body to the back plate. The at least one frame body is deformable for disengaging the at least one engaging member from the at least one engaging hole, thereby permitting removal of the at least one frame body from the back plate.

Another object of the disclosure is to provide a backlight module that can be connected to the abovementioned coupling mechanism.

Accordingly, the backlight module is adapted to be connected to the back plate of the abovementioned coupling mechanism, and includes a light source and an optical plate. Light emitted from the light source passes through the optical plate.

Another object of the disclosure is to provide a liquid crystal display device that has the abovementioned backlight module.

Accordingly, the liquid crystal display device includes the abovementioned backlight module and a display panel disposed in front of the backlight module. Light emitted from the light source passes through the optical plate and serves as a backlight of the display panel.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
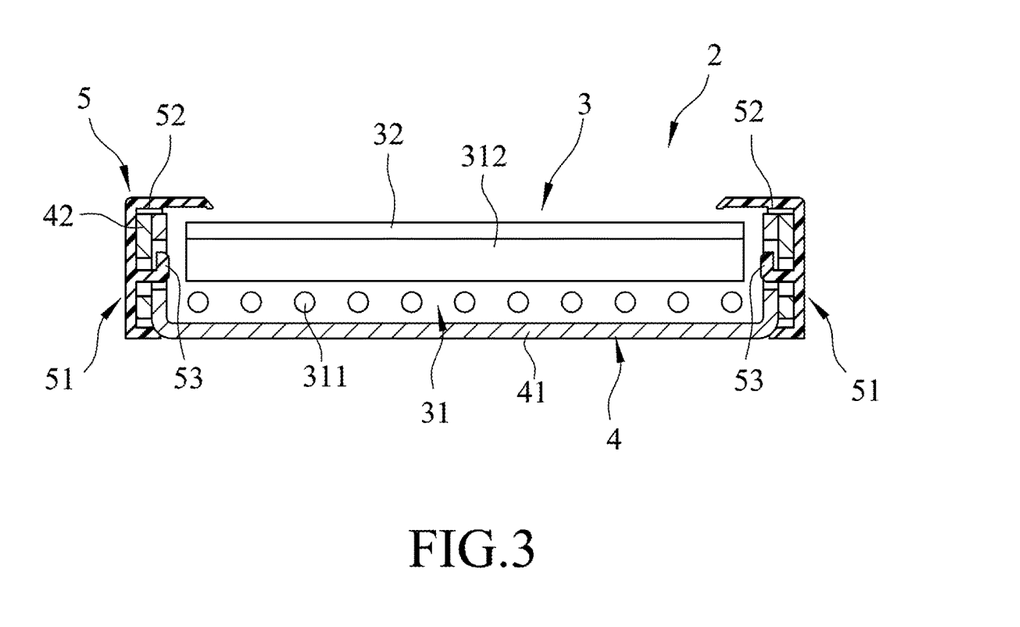
FIG. 3 is a sectional view illustrating a liquid crystal display device mounted with a direct-type backlight module and an embodiment of a coupling mechanism according to the disclosure.
Figure 4:
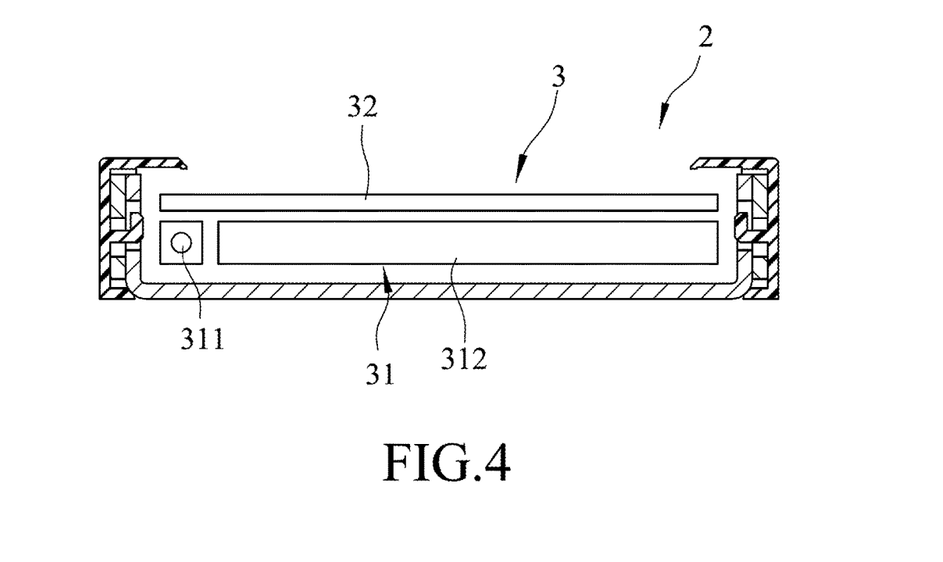
FIG. 4 is a sectional view illustrating a liquid crystal display device mounted with a side-type backlight module and the embodiment of the coupling mechanism according to the disclosure.

FIGS. 3 and 4 illustrate an embodiment of a coupling mechanism 2 according to the present disclosure. The coupling mechanism 2 is adapted to be applied to a liquid crystal display device 3. The liquid crystal display device 3 includes a backlight module 31 connected to the coupling mechanism 2, and a display panel 32 disposed in front of the backlight module 31. The backlight module 31 includes at least one light source 311 and an optical plate 312. It should be noted that the backlight module 31 may be a direct-type backlight module as shown in FIG. 3 such that the optical plate 312 serves as a diffusion plate and that light emitted from the light source 311 passes upwardly through the optical plate 312 and provides an upward backlight of the display panel 32. The backlight module 31 may also be a side-type backlight module as shown in FIG. 4 such that the optical plate 312 serves as a light guide plate, and that the light emitted laterally from the light source 311 travels in a horizontal direction toward the optical plate 312 and is reflected to provide an upward backlight of the display panel 32.

Figure 5:
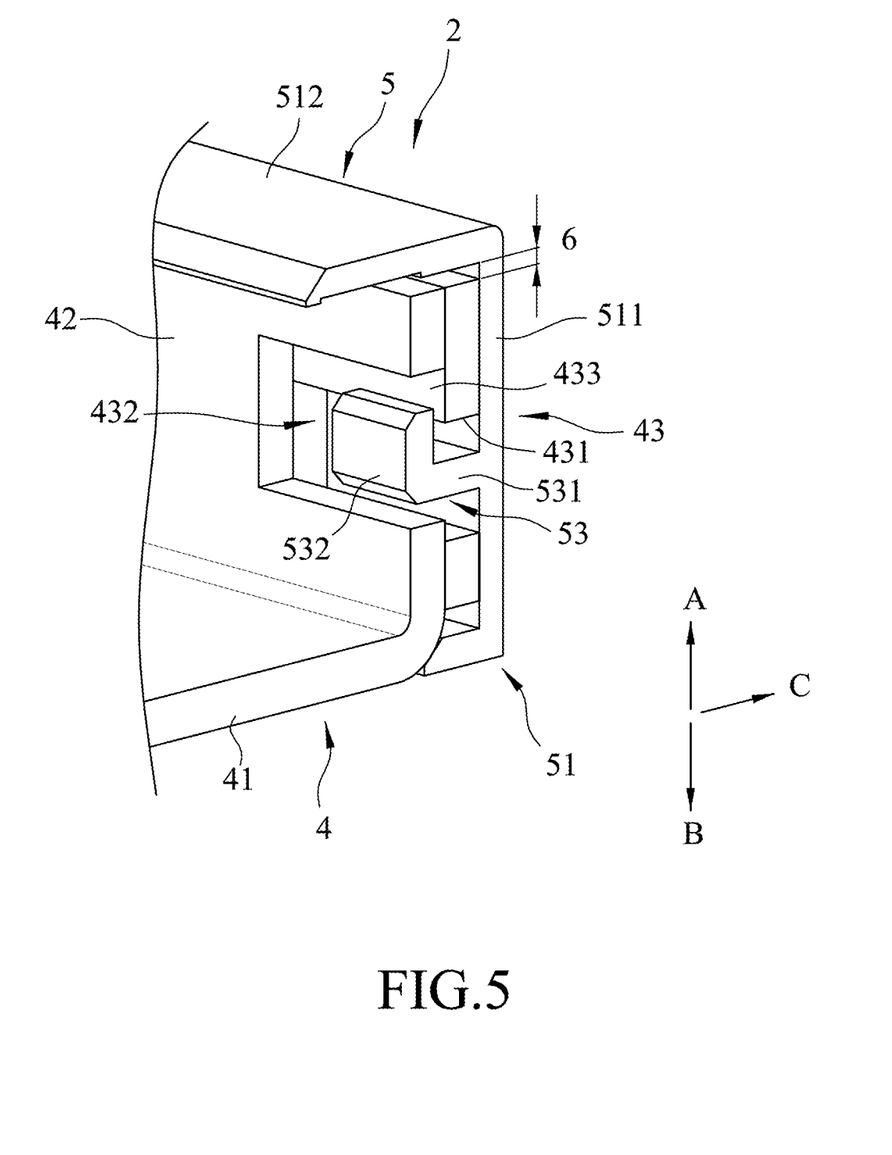
FIG. 5 is a fragmentary perspective view of the embodiment.
Figure 6:
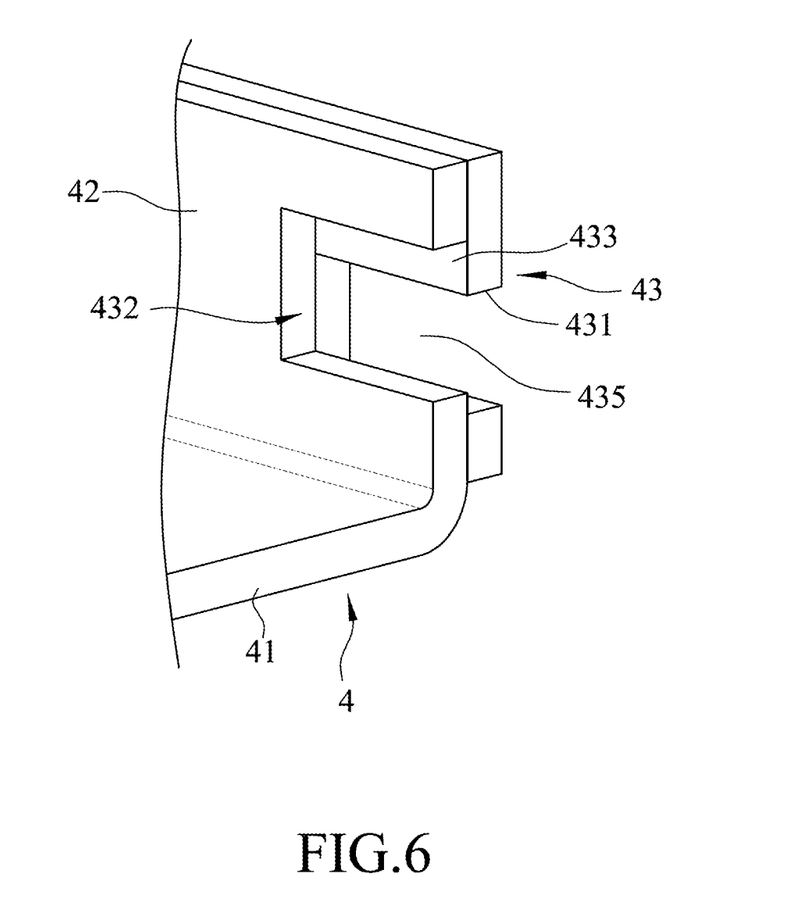
FIG. 6 is a fragmentary perspective view illustrating a back plate of the embodiment.

Referring to FIGS. 3, 5 and 6, the coupling mechanism 2 includes a back plate 4 that is coupled to the light source 311 and the optical plate 312, and a frame unit 5 removably connected to the back plate 4.

In this embodiment, the back plate 4 has a back plate portion 41 behind the backlight module 31 and parallel to the optical plate 312, and a side plate portion 42 connected to opposite outer edges of the back plate portion 41 and formed with a plurality of engaging holes 43. Each of the engaging holes 43 has a stepped shape, and has a first hole section 431, and a second hole section 432 that is larger than the first hole section 431 and that is connected to an inner end of the first hole section 431. Specifically, as shown in FIG. 6, the second hole section 432 has a connecting part 435 that extends from the first hole section 431, and an extension part 433 that is connected to the connecting part 435.

In this embodiment, the frame unit 5 has a plurality of frame bodies 51, a plurality of spaced-apart support members 52 mounted to the frame bodies 51, and a plurality of engaging members 53 extending from the frame bodies 51 and engaging respectively the engaging holes 43 for coupling fixedly the frame bodies 51 to the back plate 4.

It should be noted that, in other embodiments, the frame unit 5 may have only one frame body 51 and one engaging member 53, and the back plate 4 may be formed with only one engaging hole 43 which is engaged removably with the engaging member 53.

Referring to FIGS. 3, 5, 7 and 8, each of the frame bodies 51 has a side segment 511 disposed at an outer side of and parallel to the side plate portion 42 of the back plate 4, and a front segment 512 connected to the side segment 511, and spaced apart from and disposed in front of the optical plate 312. Specifically, the front segment 512 is bent from the side segment 511. In this embodiment, the support members 52 are mounted to a surface of the front segment 512 of each of the frame bodies 51 which faces the back plate 4, and abut against the side plate portion 42 so as to allow formation of a gap 6 therebetween (i.e., the front segment 512 of each of the frame bodies 51 and the side plate portion 42 cooperatively define the gap 6 therebetween).

It should be further noted that the support members 52 may be mounted to the back plate 4 on a surface facing the front segments 512 of the frame bodies 51 and abut against the front segments 512 of the frame bodies 51, or may even be omitted as long as the gap 6 can be formed between the front segments 512 of the frame bodies 51 and the side plate portion 42.

Figure 7:
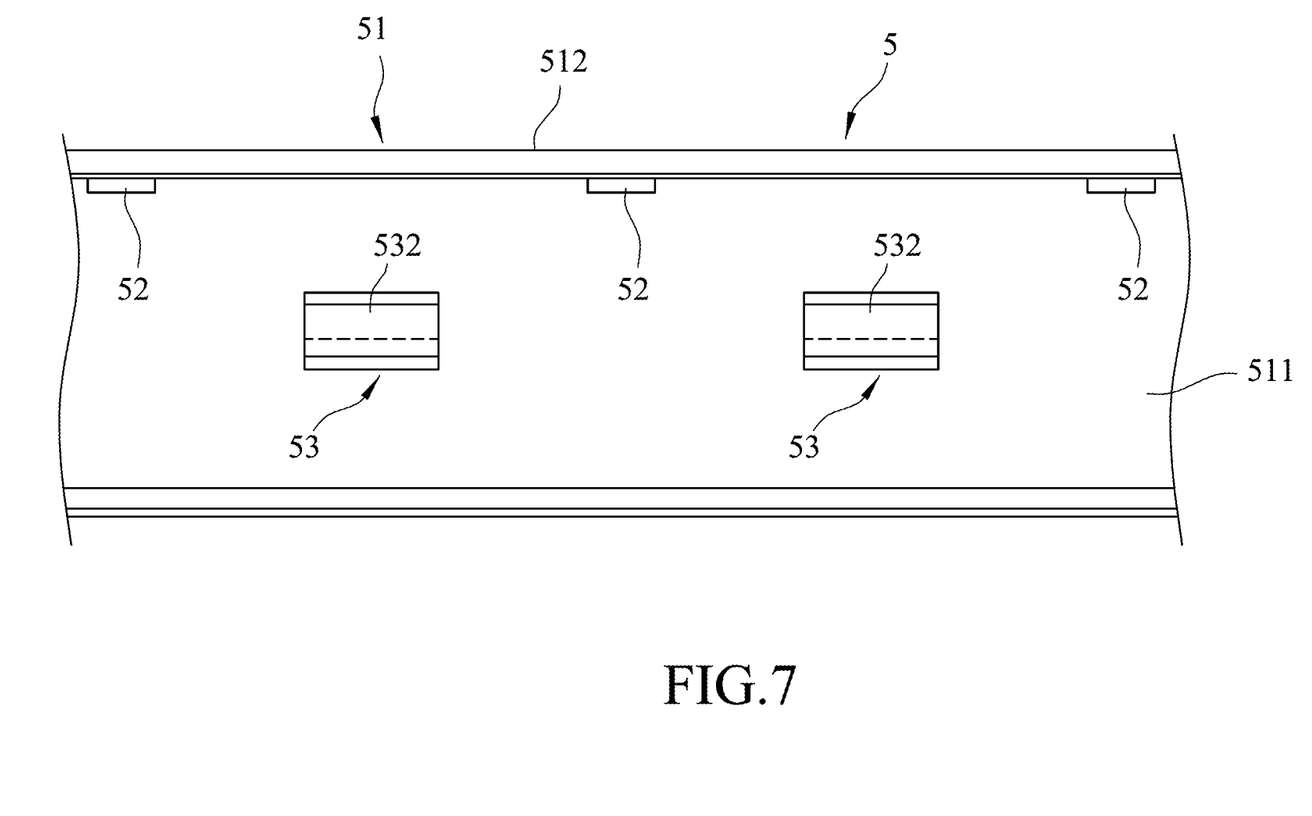
FIG. 7 is a fragmentary side view illustrating a frame unit of the embodiment.
Figure 8:
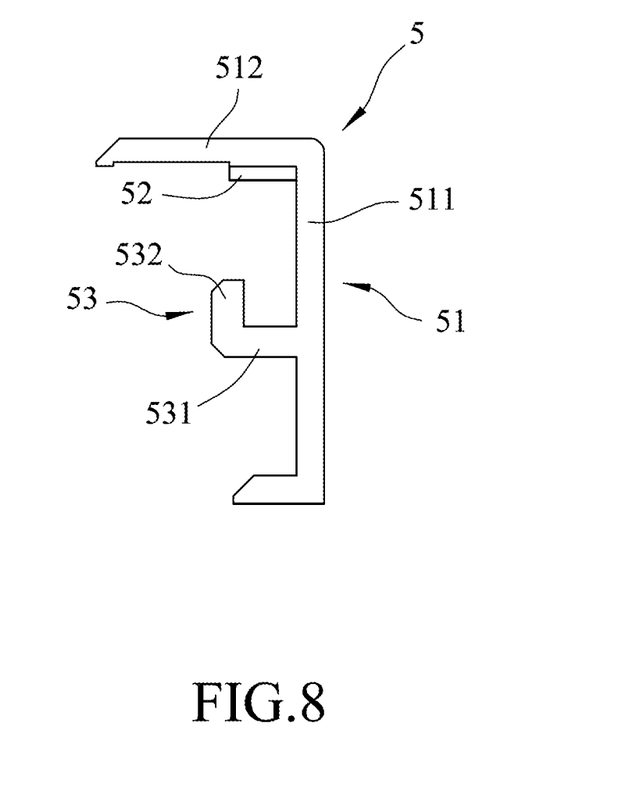
FIG. 8 is a side view illustrating the frame unit of the embodiment.

Each engaging member 53 is disposed under the gap 6 between the front segment 512 of a corresponding one of the frame bodies 51 and the side plate portion 42, and is disposed between an adjacent pair of the support members 52 as shown in FIG. 7. Each engaging member 53 has an engaging portion 531 extending from the side segment 511 of the corresponding one of the frame bodies 51 through the first hole section 431 of a respective one of the engaging holes 43, and a hook portion 532 connected to the engaging portion 531 and extending through the connecting part 435 into the extension part 433 of the second hole section 432 of the respective one of the engaging holes 43. Specifically, the hook portion 532 is bent from the engaging portion 531.

Figure 9:
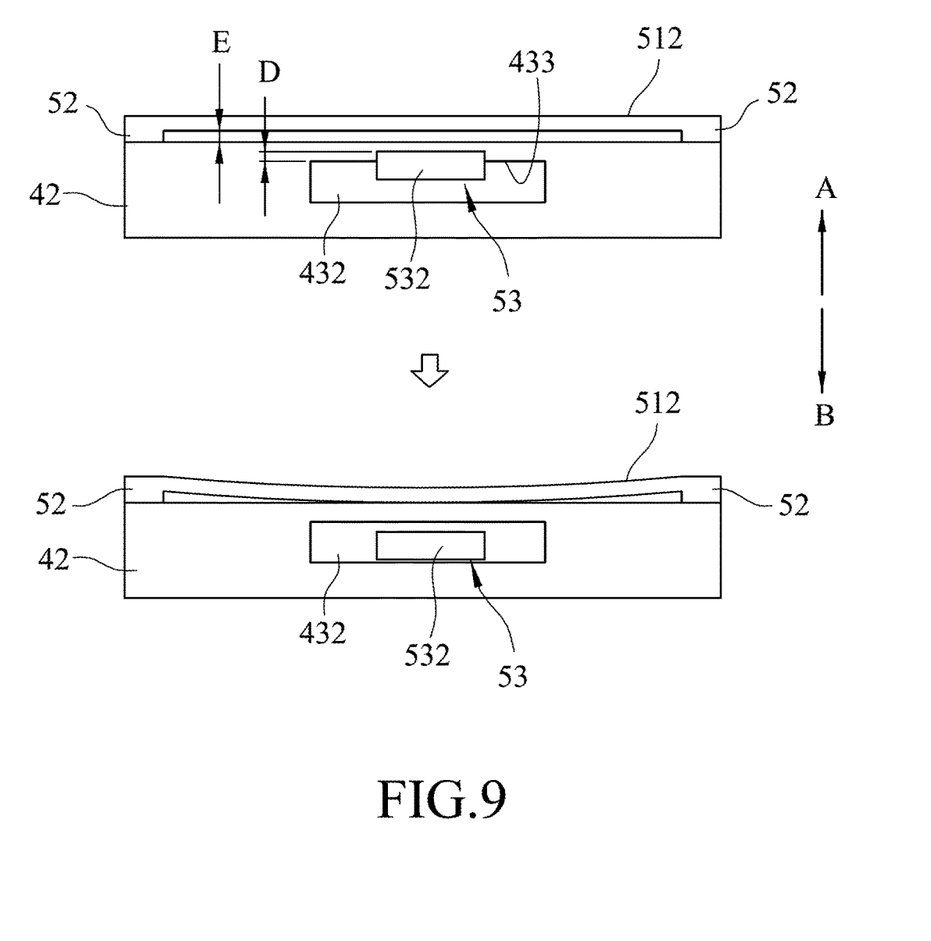
FIG. 9 is a schematic view illustrating the process of how the frame unit is disengaged from the back plate.

Referring to FIGS. 5, 7 and 9, for each of the engaging members 53, the hook portion 532 extends in a first direction (A) that is the same direction as the light emitted from the light source 311. Due to the presence of the gaps 6, the frame bodies 51 are deformable to move the hook portion 532 in a second direction (B) that is opposite to the first direction (A) to be disengaged from the extension part 433 of the second hole section 432 of the respective one of the engaging holes 43, thereby permitting removal of the engaging member 53 from the back plate 4 in a third direction (C) that is perpendicular to the first and second directions (A, B). After the engaging members 53 of each frame body 51 are removed from the corresponding engaging holes 43, each of the frame bodies 51 can be separated from the back plate 4 in the third direction (C).

As shown in FIG. 9, for each of the engaging members 53, a length (D) of a portion of the hook portion 532 that engages the extension part 433 of the second hole section 432 of the respective one of the engaging holes 43 is shorter than a distance (E) between the front segment 512 of the corresponding one of the frame bodies 51 and the side plate portion 42 (i.e., the thickness of each of the gaps 6), thereby ensuring smooth disengagement of the engaging member 53 from the respective one of the engaging holes 43 during the deformation of each of the frame bodies 51.

When the engaging members 53 engage respectively the engaging holes 43, the frame bodies 51 can be positioned on the back plate 4 without using screws or fastening members. The users can then press the front segment 512 of any of the frame bodies 51 in the second direction (B) to cause the deformation of the front segment 512, thereby actuating the disengagement of the hook portions 532 of the corresponding engaging members 53 from the extension parts 433 of the engaging holes 43. At this point, the user can remove the frame bodies 51 from the back plate 4 without using any tools.

In summary, the coupling mechanism 2 has a relatively simple structure, and the user can easily separate the frame bodies 51 from the back plate 4, so that the drawbacks associated with the abovementioned prior art can be alleviated. Moreover, the coupling mechanism 2 can be assembled with either a direct-type backlight module or a side-type backlight module, thereby allowing for a relatively large flexibility in use.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A coupling mechanism comprising:
   a back plate formed with at least one engaging hole; and
   a frame unit having at least one frame body, and at least one engaging member that extends from said at least one frame body, and that engages said at least one engaging hole for coupling fixedly said at least one frame body to said back plate, said at least one frame body being deformable for disengaging said at least one engaging member from said at least one engaging hole, thereby permitting removal of said at least one frame body from said back plate,
   wherein said at least one frame body and said back plate cooperatively define a gap therebetween,
   wherein said at least one engaging member is disposed under said gap, and
   wherein said frame unit further has a plurality of support members that are mounted to said at least one frame body, and that abut against said back plate so as to allow formation of said gap between said at least one frame body and said back plate.

2. The coupling mechanism as claimed in claim 1, wherein:
   said at least one engaging member has a portion extending in a first direction and engaging said at least one engaging hole; and
   said at least one frame body is deformable to move said portion of said at least one engaging member in a second direction opposite to the first direction to be disengaged from said at least one engaging hole, thereby permitting removal of said at least one frame body from said back plate in a third direction which is not parallel to the first and second directions.

3. The coupling mechanism as claimed in claim 1, wherein said frame unit further has a plurality of support members that are mounted to said back plate, and that abut against said at least one frame body so as to allow formation of said gap between said at least one frame body and said back plate.

4. The coupling mechanism as claimed in claim 1, wherein: said back plate has a back plate portion, and a side plate portion connected to said back plate portion and formed with said at least one engaging hole.

5. The coupling mechanism as claimed in claim 4, wherein said at least one frame body has:
   a side segment that is disposed at an outer side of said side plate portion of said back plate; and
   a front segment that is connected to said side segment, and that is spaced apart from and disposed in front of said side plate portion of said back plate.

6. The coupling mechanism as claimed in claim 5, wherein said at least one engaging member extends from said side segment of said at least one frame body and engages said at least one engaging hole.

7. The coupling mechanism as claimed in claim 1, wherein:
   said frame unit includes a plurality of said frame bodies; and
   a plurality of said engaging members extend from each of said frame bodies.

8. A backlight module adapted to be connected to said back plate of said coupling mechanism as claimed in claim 1, and includes a light source and an optical plate, light emitted from said light source passing through said optical plate.

9. A liquid crystal display device comprising:
   said backlight module as claimed in claim 8; and
   a display panel disposed in front of said backlight module, light emitted from said light source passing through said optical plate and serving as a backlight of said display panel.

10. A coupling mechanism comprising:
    a back plate formed with at least one engaging hole, and
    a frame unit having at least one frame body, and at least one engaging member that extends from said at least one frame body, and that engages said at least one engaging hole for coupling fixedly said at least one frame body to said back plate, said at least one frame body being deformable for disengaging said at least one engaging member from said at least one engaging hole, thereby permitting removal of said at least one frame body from said back plate,
    wherein:
    said at least one engaging hole has a first hole section, and a second hole section connected to an inner end of said first hole section; and
    said at least one engaging member extends through said first hole section and into said second hole section.

11. The coupling mechanism as claimed in claim 10, wherein:
    said at least one engaging hole has a stepped shape;
    said second hole section of said at least one engaging hole has a connecting part that extends from said first hole section, and an extension part that is connected to said connecting part;
    said at least one engaging member has an engaging portion extending through said first hole section of said at least one engaging hole, and a hook portion connected to said engaging portion and extending through said connecting part into said extension part of said second hole section of said at least one engaging hole; and
    a length of a portion of said hook portion engaging said extension part of said at least one engaging hole is shorter than a distance between said front segment of said at least one frame body and said side plate portion of said back plate.

12. The coupling mechanism as claimed in claim 10, wherein: said back plate has a back plate portion, and a side plate portion connected to said back plate portion and formed with said at least one engaging hole.

13. The coupling mechanism as claimed in claim 12, wherein said at least one frame body has:
    a side segment that is disposed at an outer side of said side plate portion of said back plate; and
    a front segment that is connected to said side segment, and that is spaced apart from and disposed in front of said side plate portion of said back plate.

14. The coupling mechanism as claimed in claim 13, wherein said at least one engaging member extends from said side segment of said at least one frame body and engages said at least one engaging hole.

15. The coupling mechanism as claimed in claim 10, wherein:
    said frame unit includes a plurality of said frame bodies; and
    a plurality of said engaging members extend from each of said frame bodies.

16. A backlight module adapted to be connected to said back plate of said coupling mechanism as claimed in claim 10, and includes a light source and an optical plate, light emitted from said light source passing through said optical plate.

17. A liquid crystal display device comprising:
    said backlight module as claimed in claim 16; and
    a display panel disposed in front of said backlight module, light emitted from said light source passing through said optical plate and serving as a backlight of said display panel.

* * * * *